(12) United States Patent
Casagnap et al.

(10) Patent No.: US 10,692,062 B2
(45) Date of Patent: Jun. 23, 2020

(54) AUTO LOOKUP FOR A SELF-SERVICE TERMINAL (SST) NETWORK

(71) Applicant: NCR Corporation, Duluth, GA (US)

(72) Inventors: Marvin Paraso Casagnap, Cebu (PH); Arsenio Jr. Lumabi Codilla, Cebu (PH); Julie Ann Lavares Lasala, Cebu (PH); Vanessa Mae Yasay Orog, Lapu-Lapu (PH)

(73) Assignee: NCR Corporation, Atlanta, GA (US)

( * ) Notice: Subject to any disclaimer, the term of this patent is extended or adjusted under 35 U.S.C. 154(b) by 337 days.

(21) Appl. No.: 15/581,725

(22) Filed: Apr. 28, 2017

(65) Prior Publication Data

US 2018/0315033 A1 Nov. 1, 2018

(51) Int. Cl.
| | |
|---|---|
| *G06Q 20/18* | (2012.01) |
| *G06F 16/532* | (2019.01) |
| *G07G 1/00* | (2006.01) |
| *G07F 9/02* | (2006.01) |
| *G07G 1/01* | (2006.01) |
| *G06Q 20/20* | (2012.01) |

(52) U.S. Cl.
CPC .......... *G06Q 20/18* (2013.01); *G06F 16/532* (2019.01); *G06Q 20/202* (2013.01); *G07F 9/023* (2013.01); *G07G 1/0045* (2013.01); *G07G 1/01* (2013.01)

(58) Field of Classification Search
CPC ...... G06F 3/023; G06F 16/95; G06F 3/04895; G06Q 20/1085; G06Q 20/40; G06Q 20/18; G06Q 20/20; G06Q 40/00; G06Q 20/40145; G06Q 40/02; G06Q 20/00; G06Q 20/042; G06Q 20/10; G06Q 20/202; G06Q 20/208; G06Q 20/382; G06Q 30/06; G06Q 20/0453; G06Q 20/065; G06Q 20/209; G06Q 20/3223; G06Q 20/3274; G06Q 20/405; G06Q 30/0609; G06Q 40/12; G07F 19/20; G07F 19/206; G07F 19/211; G07F 19/201; G07F 19/209; G07G 1/14; G07G 5/00; H04L 29/06; H04L 63/0853; H04L 63/0861; H04L 67/02; H04L 67/12; H04L 67/2842; H04L 67/34; H04L 69/329
USPC ...... 705/14.65, 16, 17, 24, 35, 36 R, 43, 44, 705/75; 235/375, 379; 358/462
See application file for complete search history.

(56) References Cited

U.S. PATENT DOCUMENTS

| | | | | |
|---|---|---|---|---|
| 10,248,942 | B1* | 4/2019 | Catoe | G06Q 20/18 |
| 2002/0099634 | A1* | 7/2002 | Coutts | G06Q 20/1085 |
| | | | | 705/35 |
| 2003/0116622 | A1* | 6/2003 | Suttie | G07F 19/20 |
| | | | | 235/379 |
| 2005/0139649 | A1* | 6/2005 | Metcalf | G06Q 20/20 |
| | | | | 235/375 |
| 2007/0179889 | A1* | 8/2007 | Drummond | G06F 3/023 |
| | | | | 705/43 |

(Continued)

*Primary Examiner* — Olabode Akintola
*Assistant Examiner* — Sanjeev Malhotra
(74) *Attorney, Agent, or Firm* — Schwegman, Lundberg & Woessner (57) ABSTRACT

A Self-Service (SS) management terminal receives real-time item exception images for exception items of a remote transaction being processed on a remote SS Terminal (SST). Image searching is performed on the exception images to automatically lookup item details for the exception items. The item details are automatically and remotely keyed into the remote transaction of the remote SST for the remote transaction to continue.

16 Claims, 4 Drawing Sheets

(56) References Cited

U.S. PATENT DOCUMENTS

| | | | | |
|---|---|---|---|---|
| 2008/0133420 A1* | 6/2008 | Barber | G06Q 10/00 | 705/75 |
| 2008/0162293 A1* | 7/2008 | Gauld | G06Q 20/209 | 705/24 |
| 2008/0319903 A1* | 12/2008 | Rossmann | G06Q 20/1085 | 705/43 |
| 2010/0280871 A1* | 11/2010 | Goertz | G06Q 20/1085 | 705/43 |
| 2011/0288999 A1* | 11/2011 | McGraw | G06Q 20/40 | 705/44 |
| 2012/0253953 A1* | 10/2012 | Aziz | G06Q 20/40145 | 705/16 |
| 2014/0040051 A1* | 2/2014 | Ovick | G06Q 20/29 | 705/16 |
| 2014/0108245 A1* | 4/2014 | Drummond | G06F 3/023 | 705/43 |
| 2014/0244500 A1* | 8/2014 | Elias | G06Q 20/00 | 705/43 |
| 2014/0319210 A1* | 10/2014 | Angus | G07F 19/209 | 235/379 |
| 2014/0330655 A1* | 11/2014 | Aziz | G06O 20/40145 | 705/16 |
| 2015/0026065 A1* | 1/2015 | Collins | G06Q 20/042 | 705/44 |
| 2015/0235303 A1* | 8/2015 | Taylor | G06Q 30/0268 | 705/14.65 |
| 2015/0294289 A1* | 10/2015 | Sadiq | G06Q 20/322 | 705/17 |
| 2015/0317628 A1* | 11/2015 | Rossmann | G07F 19/209 | 705/43 |
| 2015/0356525 A1* | 12/2015 | Bonnevay | G06Q 20/065 | 705/36 R |
| 2016/0019510 A1* | 1/2016 | Guntupalli | G06Q 20/3274 | 705/43 |
| 2016/0098904 A1* | 4/2016 | Choudhury | G07F 19/203 | 705/43 |
| 2016/0180166 A1* | 6/2016 | Egan | G06Q 20/208 | 358/462 |
| 2016/0321627 A1* | 11/2016 | McCracken | G06Q 20/1085 | |
| 2016/0350725 A1* | 12/2016 | Arthur | G06Q 20/18 | |
| 2018/0060928 A1* | 3/2018 | Sadler | G06Q 20/20 | |
| 2018/0218350 A1* | 8/2018 | Crooks | G06K 1/121 | |

\* cited by examiner

AUTO LOOKUP FOR A SELF-SERVICE TERMINAL (SST) NETWORK

BACKGROUND

Managing Self-Service Terminals (SSTs), such as Self-Service Checkout (SSCO) stations, is often a laborious task especially when there are multiple lanes SSCO stations. Each SSCO station needs to communicate with a store server and typically this is done through a management terminal. The management terminal is configured to monitor some of the SSCO stations and is typically within line of sight or close distance to the SSCO stations that the management terminal manages. This is so, because should assistance or overrides be needed, a clerk managing a management terminal can see what is happening on the management terminal and quickly assist.

However, because a single clerk can only handle a limited number of SSCO stations and because a management terminal can only manage report information from a limited number of SSCO stations, a single management terminal cannot be too loaded. As a result, a typical retail setting will have several management terminals.

One issue that occurs with some regularity is that a customer may not be able to properly scan an item while operating the SSCO, which requires manual assistance from a clerk operating one of the management terminals. Clerk assistance can be needed at the SSCO for a variety of other reasons as well, such as: customer age verification for purchasing an item where the age of the customer is needed, weight verification for an item that needs weighed, and item visual verification for an item that is unusually expensive or close in appearance to a different item where the price varies substantially between the two items (such as normal produce versus organic produce).

During periods of high customer traffic, the clerks that operate the management terminals can become overloaded and the queues at the SSCOs can grow in length. This causes customer frustration and reduces throughput of a retailer, which can ultimately adversely affect customer loyalty to the retailer and the retailer's revenues.

SUMMARY

In various embodiments, methods and a Self-Service (SS) management terminal are provided for remote automated lookup and entry at a SST.

According to an embodiment, a method for remote automated lookup and entry at a SST is provided. Specially, and in an embodiment, an image of an item that is being processed on a Self-Service Terminal (SST) is received. An item database is search with the image for obtaining item details. Finally, the item details are provided to the SST for continuing a transaction occurring at the SST having the item.

DETAILED DESCRIPTION

Figure 1:
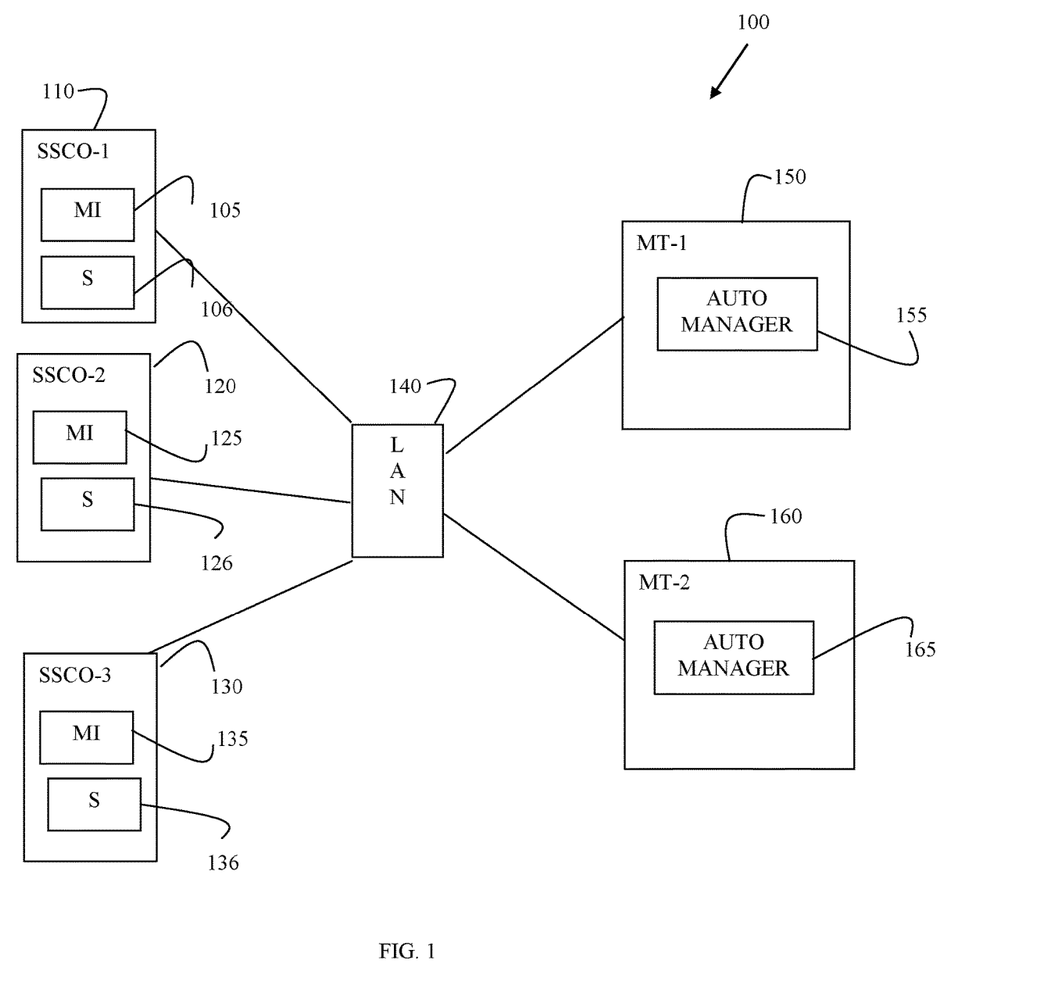
FIG. 1 is a diagram illustrating components of a SST remote automated lookup and entry system, according to an example embodiment.

FIG. 1 is a diagram illustrating components of a SST remote automated lookup and entry system 100, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of remote automated lookup and entry at a SST, presented herein and below.

Furthermore, the techniques and the systems presented herein and below (for remote automated lookup and entry at a SST) may include all or some combination of the components shown with the system 100. The methods are programmed as executable instructions in memory and/or non-transitory computer-readable storage media and executed on one or more processors associated with the components/devices.

Specifically, the system 100 includes (by way of illustration) three SSCO terminals 110, 120, and 130; two SS management terminals 150 and 160, and a Local Area Network (LAN) 140. SSCO terminals 110, 120, and 130 include a management interface 105, 125, and 135, as well as scanners 106, 126, and 136, respectively. Each of the SS management terminals 160 and 170 include an automatic lookup and entry manager (herein after "auto manager") 155 and 165, respectively.

The management interfaces (105, 125, and 135) are software agents that are executed as executable instructions from non-transitory memory or storage by processors of the SSCO terminals (110, 120, and 130). Each instance of the management interface (105, 125, and 135) is responsible for communicating images of items placed in front of the scanners 116, 126, and 136 to its assigned management terminal (150 or 160) during customer transactions at the SSCO terminals 110, 120, and 130.

Each SS management terminal (150 and 160) may include real-time management software that permits an operator to view transactions taking place on the SSCO terminals (110, 120, and/or 130). The viewed transactions on the displays of the SS management terminals (150 and 160) depends on the assigned and configured SSCO terminals (110, 120, and 130) assigned to the SST management terminals (150 and/or 160).

Each SS management terminal (150 and 160) reports transaction information to a server (which may be located on the LAN 140 or located external to the system 100 over a Wide-Area Network (WAN and not shown in the FIG. 1).

Initially, any particular SSCO terminal, such as 110, has a customer begin a transaction. As the customer scans items through the scanner 106 and image and the progress of the transaction is communicated over the LAN 140 by the management interface 105 to a particular SS management terminal, such as 150. If the transaction failed to properly scan (record the bar code for the item), the auto manager 155 extracts features of the image and performs a search for the item on an item database of the retailer. The search returns the barcode for the item and the auto manager 155 returns the item details to the management interface 155 for the ongoing transaction at the SSCO terminal 110. The image search may also be performed on a different device of the LAN 140 dedicated to image feature extraction and searching an item database for an item barcode that is linked to the item details.

So, when an item is placed in view of the scanner 106 at the SSCO terminal 110, the scanner 106 takes an image of the item within the field-of-view of the scanner camera lens and the management interface 105 sends the image for displaying on the management terminal 150. When the transaction that is being monitored at the management terminal 150 fails to note a bar code for the item, such as after a configured period of time, the auto manager 155 may automatically initiate an image feature extraction (after a preconfigured period of elapsed time) and search of the item database for the item barcode and details. Alternatively, a clerk operating the management terminal 150 may select an interface option to initiate the image feature extraction and item database search. The clerk can monitor the ongoing transaction in real time at the management terminal 150.

An item's barcode may not be the only reason for the above-discussed processing. For example, items that record weights that fall outside of a predefined range for a noted item may trigger the management interface 105 to request manual assistance by the clerk at the SSCO terminal 150. In such a case, the image of the item can be inspected and searched and the clerk can interact with the auto manager 155 to override and permit the noted weight or insert an expected weight. The clerk may or may not need to manually visit the SSCO terminal 110 to inspect and weight the item.

In another case, a good may be purchased that requires an age verification of the clerk. In such a case, the clerk may visually inspect the SSCO terminal area and may be able to override the requirement if the customer appears to be well within the age requirements or may send a message to the SSCO terminal 110 through the auto manager 155 and the management interface 105 that instructs the customer to place the customer's government issued identification in front of the scanner 106. The image of the identification card captured by the scanner 106 and sent back for display by the management interface 106 to the management terminal 150. This can work with checks that need cashed as well for a transaction, such that the identification of the customer can be captured and transmitted as an image to the clerk that operates the management terminal 150.

In an embodiment, the customer provides a keyed in code for an item at the SSCO 110, if the item is placed in the view of the scanner 106 then the image is transmitted to the auto manager 155 for display on the attendant terminal 150. A database of images for item codes can also be accessed and that image displayed on the terminal 150. The attendant can then make a determination if the correct key code was used for the item being purchased.

The system 100 provides a mechanism by which exception scenarios can be handled remotely by a clerk or an attendant of the management terminals 150 and 160 for transactions that are ongoing in real time at the SSCO terminals 110, 120, and 130. In some cases, the exception processing can be handled automatically without the intervention of the attendant. In other situations, the attendant can resolve the exception scenario through an attendant interface to the auto manager 155 and 165. The scanners 106, 126, and 136 interact with the management interfaces 105, 125, and 135 to send images of items being placed in front of and captured by the scanner 106, 126, and 136. The management interfaces 105, 125, and 135 send the images in real time over the LAN to the management terminals 150 and 160 and the auto managers 155 and 165. Some item detail exceptions can be automatically resolved and keyed into the transaction with the proper item barcodes for the ongoing transactions in an automatic fashion by the auto managers 155 and 165. Other item exception details can be handled through attendant actions while operating the attendant interface of the auto manager 155 and 165 at the management terminals 150 and 160.

Exception details can include, such things as: 1) failure to properly scan a bar code on an item (because one was not present on the item; the barcode was damaged on the item; and/or the customer did not place the side of the item in the field of view of the scanners 106, 126, and 136); 2) the weight for an item is outside a range or was not noted; 3) the item being purchased requires age verification; 4) the transaction requires customer identification; and the other things.

The auto managers 155 and 165 cooperate with the management interfaces 105, 125, and 135 to automatically key in any missing item barcodes for proper identification of exception items that were not properly scanned by a customer at the SSCO terminals 110, 120, and 130. Attendants can also interact with the auto managers 155 and 165 to remote key item bar codes for any given transaction.

The system 100: 1) allows for proper identification of exception items scanned through the scanners 106, 126, and 136; 2) provides easier and faster attendant actions since the attendant can just deal with any noted exception items for a given transaction in situations where the attendant is needed at the SSCO terminals 110, 120, and 130 to address exception items; and 3) provides a level of confidence to the attendant that the bar code keyed in matches the actual exception item by providing an image of the exception item to the attendant on the management terminal 150 and 160.

These and other embodiments are now discussed with reference to the FIGS. 2-4.

Figure 2:
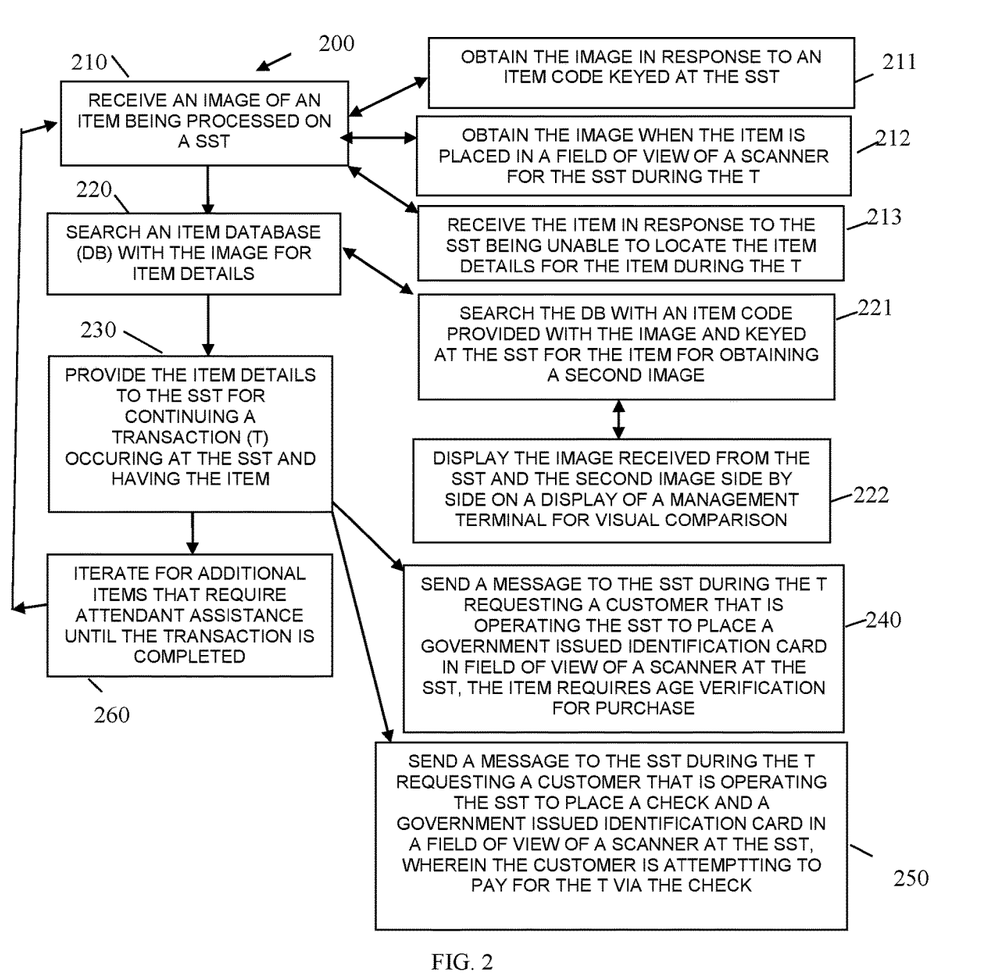
FIG. 2 is a diagram of a method for remote automated lookup and entry at a SST, according to an example embodiment.

FIG. 2 is a diagram of a method 200 for remote automated lookup and entry at a SST, according to an example embodiment. The software module(s) that implements the method 200 is referred to as a "SST exception item manager." The SST exception item manager is implemented as executable instructions programmed and residing within memory and/or a non-transitory computer-readable (processor-readable) storage medium and executed by one or more processors of a device. The processor(s) of the device that executes the SST exception item manager are specifically configured and programmed to process the SST exception item manager. The SST exception item manager has access to a network during its processing. The network can be wired, wireless, or a combination of wired and wireless.

In an embodiment, the device that executes the SST exception item manager is one of the SS management terminals (150 or 160) of the FIG. 1.

In an embodiment, the device that executes the SST exception item manager is a cashier terminal in geographic proximity to SSTs.

In an embodiment, the SST exception item manager is the auto manager (155 or 165) of the FIG. 1.

At 210, the SST exception item manager receives an image of an item being processed on a SST. The image may be received for each item placed in a field of view of a scanner at the SST or the image may be received based on an item being placed in a field of view of the scanner and was unable to be scanned for an item code (bar code).

According to an embodiment, at 211, the SST exception item manager obtains the image in response to an item code keyed at the SST. That is, the customer operating the SST may enter a code (such as for produce) and the image is taking of the produce from the scanner of the SST and sent to the SST exception item manager.

In an embodiment, at 212, the SST exception item manager obtains the image when the item is placed in a field of view of the scanner for the SST during the transaction.

In an embodiment, at 213, the SST exception item manager receives the item in response to the SST being unable to locate the item details for the item during the transaction (such as no bar code or no customer entered code for produce).

At 220, the SST exception item manager searches an item database with the image for obtaining item details for the item.

According to an embodiment, at 221, the SST exception item manager searches the item database with an item code provided with the image and keyed at the SST for the item for obtaining a second image. That is, a model image for the item may be obtained based on the keyed item code as a second image.

In an embodiment of 221 and at 222, the SST exception item manager displays the image received from the SST for the item and the second (model) image side by side on a display of a management terminal for visual comparison by an attendant that is operating the management terminal.

At 230, the SST exception item manager provides the item details to the SST for continuing a transaction occurring at the SST and having the item. That is, the transaction is provided the item details for the SST to continue the transaction.

In an embodiment, at 240, the SST exception item manager sends a message to the SST during the transaction requesting a customer that is operating the SST to place a government issued identification card in a field of view of a scanner at the SST. This is a case where the item requires age verification for purchase.

In an embodiment, at 250, the SST exception item manager sends a message to the SST during the transaction requesting a customer that is operating the SST to place a check and a government issued identification card in a field of view of a scanner at the SST. This is a case where the customer is attempting to pay for the transaction at the SST via the check.

In an embodiment, at 260, the SST exception item manager iterates the processing of 210-230 for additional items that require attendant assistance until the transaction is completed. In this manner, the attendant does not have to physically attend to the transaction at the SST but can handle all exception items requiring attendant attention from the management terminal (the device that executes the SST exception item manager).

Figure 3:
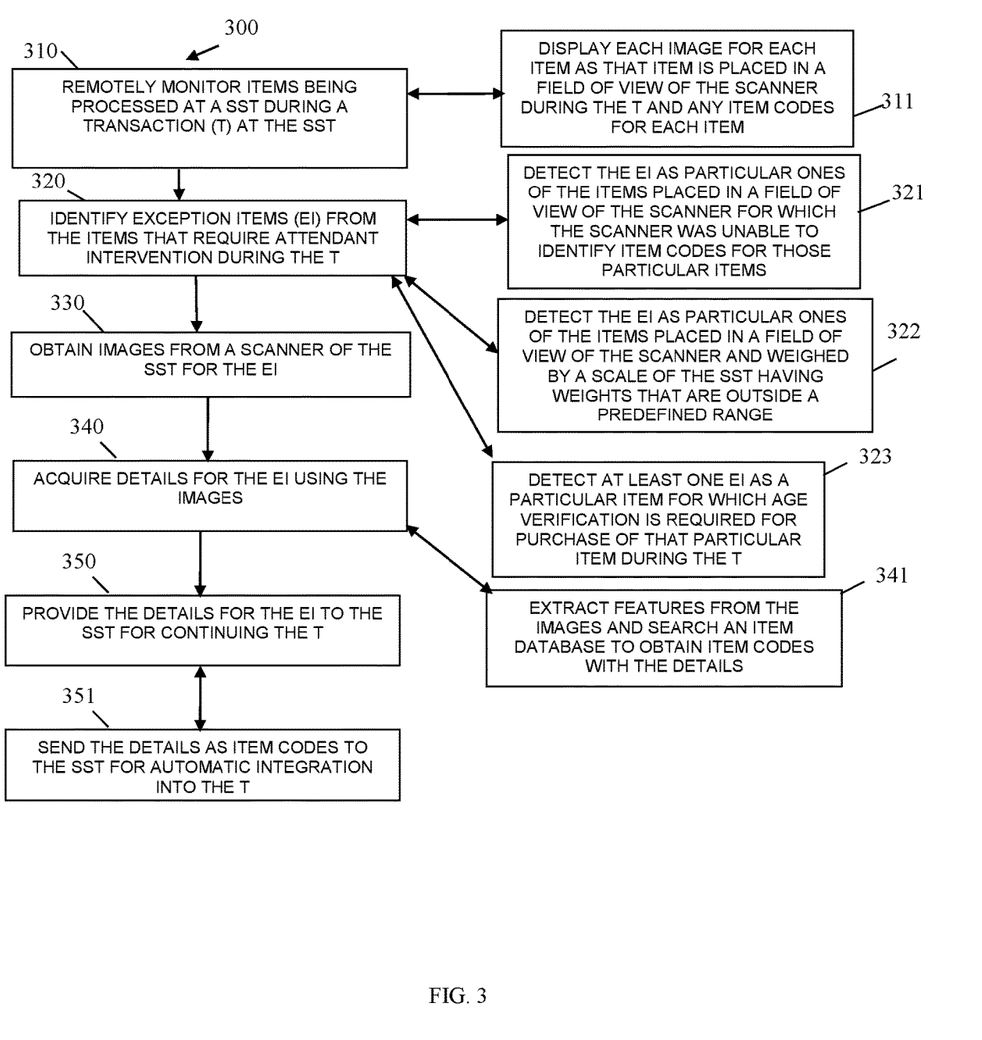
FIG. 3 is a diagram of another method for remote automated lookup and entry at a SST, according to an example embodiment.

FIG. 3 is a diagram of another method 300 for remote automated lookup and entry at a SST, according to an example embodiment. The software module(s) that implements the method 300 is referred to as a "remote item exception manager." The remote item exception manager is implemented as executable instructions programmed and residing within memory and/or a non-transitory computer-readable (processor-readable) storage medium and executed by one or more processors of a hardware device. The hardware processors that execute the remote item exception manager are specifically configured and programmed to process remote item exception manager. The remote item exception manager has access to one or more networks during its processing. Each network can be wired, wireless, or a combination of wired and wireless.

In an embodiment, the remote item exception manager is the auto manager (155 or 165) of the FIG. 1.

In an embodiment, the remote item exception manager is the method 200 of the FIG. 2.

In an embodiment, the device that executes the remote item exception manager is the SS management terminal (150 or 160) of the FIG. 1.

In an embodiment, the device that executes the remote item exception manager is cashier operated terminal in geographic proximity to the SSTs.

In an embodiment, the processing of the remote item exception manager reflects another and in some cases enhanced perspective of the processing associated with the method 200 of the FIG. 2.

At 310, the remote item exception manager remotely monitors items being processed at a SST during a transaction of a customer at the SST.

In an embodiment, at 311, the remote item exception manager displays each image for each item as that item is placed in a field of view of a scanner during the transaction and displays any item codes for each item as each item is being processed by the customer at the SST.

At 320, the remote item exception manager identifies exception items from the items that require attendant intervention during the transaction. This can be done entirely in an automated manner or can be done in a semi-automated manner with an attendant interaction with an attendant interface to the remote item exception manager.

According to an embodiment, at 321, the remote item exception manager detects the exception item as particular ones of the items placed in a field of view of the scanner for which the scanner was unable to identify item codes for those particular items.

In an embodiment, at 322, the remote item exception manager detects the exception items as particular ones of the items place in a field of view of the scanner and weighed by a scale of the SST. The weights for these items are outside a predefined and expected range for these items.

In an embodiment, at 323, the remote item exception manager detects at least one exception item as a particular item for which age verification is required for purchase of that particular item during the transaction.

At 330, the remote item exception manager obtains image from the scanner of the SST for the exception items during the transaction and as the exception items are placed in a field of view of the scanner.

At 340, the remote item exception manager acquires details for the exception items using the images.

In an embodiment, at 341, the remote item exception manager extract features from the images and searches an item database to obtain item codes with the details.

At 350, the remote item exception manager provides the details for the exception items to the SST for continuing with the transaction at the SST with the customer.

According to an embodiment, at 351, the remote item exception manager sends the details as item codes to the SST for automatic integration (automatic keying) into the transaction during the transaction.

Figure 4:
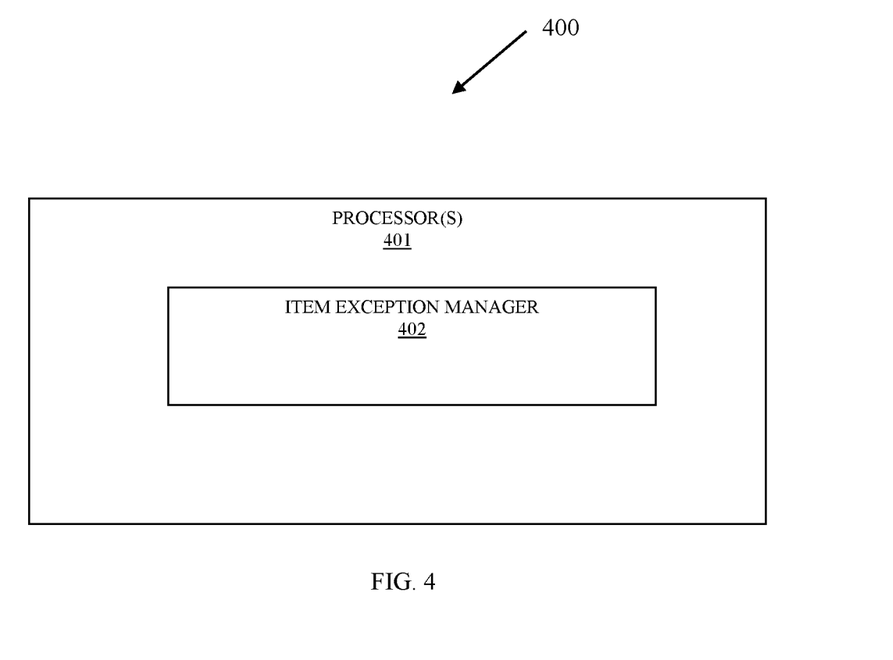
FIG. 4 is a diagram of Self-Service (SS) management terminal, according to an example embodiment.

FIG. 4 is a diagram of SS management terminal 400 (terminal 400), according to an example embodiment. Some components of the terminal 400 are programmed and reside within memory and/or a non-transitory computer-readable medium and execute on one or more processors of the terminal 400. The terminal 400 communicates over one or more networks, which can be wired, wireless, or a combination of wired and wireless.

In an embodiment, the terminal 400 is a SST configured to operate as the SS management terminal (150 or 160) of the FIG. 1.

In an embodiment, the terminal 400 implements, among other things, the processing discussed in the FIGS. 1-3.

The terminal 400 includes at least one hardware processor 401 and an item exception manager 402.

The item exception manager 402 is configured to: 1) execute on the processor 401, 2) receive images from a scanner of a SST for items being processed during a transaction at the SST, 3) obtain item codes for select images representing exception items for which the SST was unable to determine the item codes, and 4) auto key the item codes into the transaction for the SST for continuing the transaction.

In an embodiment, the item exception manager 402 is further configured to: v) present the select images on a display of the SS management terminal 400 for visual review by an attendant operating the SS management terminal 400.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   remotely monitoring, by executable instructions that execute on a processor of a management terminal, transaction details for a transaction being processed on a Self-Service Terminal (SST) through network interactions between the executable instructions and a software agent executing on the SST;
   receiving, by the executable instructions, an image of an item being processed on the SST from the software agent when the SST is unable to locate item details for the item during the transaction at the SST within a preconfigured period of elapsed time;
   searching, by the executable instructions, an item database with the image for the item details, wherein searching further includes extracting features from the image and automatically initiating a search using the features against the item database, receiving the item details and a bar code for the item as a search result of the search;
   providing, by the executable instructions, the item details and the barcode to the software agent of SST for continuing the transaction occurring at the SST and having the item;
   managing, by the executable instructions, exception scenarios during the transaction from the management terminal including automatically resolving, by the executable instructions, first exception scenarios and resolving second exception scenarios through an attendant interface provided on the management terminal, wherein managing further includes:
      detecting the first exception scenarios and the second exception scenarios as any of: a failure to scan a particular bar code of a particular item during the transaction, a weight for the particular item is outside an expected range weight, the particular item requires age verification, and the transaction requires customer identification and,
   processing the transaction without any intervention that requires an attendant to be physically present at the SST by automatically processing any of the first exception scenarios and the second exception scenarios through the executable instructions and the attendant interface by i) locating particular item details and a particular bar code for a particular image captured of the particular item and providing the particular item details and the particular bar code to the software agent for a particular transaction being processed at the SST, ii) receiving an override item weight from the attendant interface when a particular weight for the particular item is outside the expected range weight and providing the override item weight to the software agent for the particular transaction being processed at the SST, and iii) receiving an override item/customer verification from the attendant interface when the particular item requires the age verification or when the particular transaction requires the customer identification and providing the override item/customer verification to the software agent for the particular transaction being processed on the SST.

2. The method of claim 1, wherein receiving further includes obtaining the image in response to an item code keyed at the SST.

3. The method of claim 1, wherein receiving further includes obtaining the image when the item is placed in a field of view of a scanner for the SST during the transaction.

4. The method of claim 1, wherein searching further includes searching the item database with an item code provided with the image from the software agent and keyed at the SST for the item and obtaining a second image from the item database associated with the item code that does not match the image provided by the software agent.

5. The method of claim 4, wherein searching further includes displaying the image received from SST and the second image side by side on a display of a management terminal for visual comparison.

6. The method of claim 3 further comprising, sending a message to the SST during the transaction requesting a customer that is operating the SST to place a government issued identification card in the field of view of the scanner at the SST, wherein the item requires age verification.

7. The method of claim 3 further comprising, sending a message to the SST during the transaction requesting a customer that is operating the SST to place a check and a government issued identification card in the field of view of the scanner at the SST, wherein the customer is attempting to pay for the transaction via the check.

8. The method of claim 1 further comprising, iterating the method for additional items that requires attendant assistance until the transaction is completed at the SST.

9. A method, comprising:
remotely monitoring, by executable instructions that execute on a processor of a management terminal, items being processed at a Self-Service Terminal (SST) during a transaction at the SST through network interactions between the executable instructions and a software agent executing on the SST;
identifying, by the executable instructions, exception items from the items that indicate a requirement that an attendant intervention is needed during the transaction;
obtaining, by the executable instructions, images from a scanner of the SST for the exception items from the software agent when the SST is unable to resolve the exception items within a preconfigured elapsed period of time;
acquiring, by the executable instructions, details for the exception items using the images by extracting features from the images and automatically initiating searches using the features against an item database, and receiving the details and bar codes for the exception items as search results of the searches;
providing, by the executable instructions, the details and the bar codes for the exception items to the software agent of the SST for continuing the transaction; and
managing, by the executable instructions, the exception items during the transaction from the management terminal including automatically resolving, by the executable instructions, first exception items and resolving second exception items through an attendant interface provided on the management terminal, wherein managing further includes:
detecting the first exception items and the second exception items as any of: a failure to scan a particular bar code of a particular item during the transaction, a weight for the particular item is outside an expected range weight, the particular item requires age verification, and the transaction requires customer identification; and
processing the transaction without any intervention that requires an attendant to be physically present at the SST by automatically processing any of the first exception items and the second exception items through the executable instructions and the attendant interface by i) locating particular item details and a particular bar code for a particular image captured of the particular item and providing the particular item details and the particular bar code to the software agent for a particular transaction being processed at the SST, ii) receiving an override item weight from the attendant interface when a particular weight for the particular item is outside the expected range weight and providing the override item weight to the software agent for the particular transaction being processed at the SST, and iii) receiving an override item/customer verification from the attendant interface when the particular item requires the age verification or when the particular transaction requires the customer identification and providing the override item/customer verification to the software agent for the particular transaction being processed on the SST.

10. The method of claim 9, wherein remotely monitoring further includes displaying each image for each item as that item is placed in a field of view of the scanner during the transaction and any provided item codes for each of the items.

11. The method of claim 10, wherein identifying further includes detecting the exception items as particular ones of the items placed in the field of view of the scanner for which the scanner was unable to identify item codes for those particular items.

12. The method of claim 10, wherein identifying further includes detecting the exception items as particular ones of the items placed in the field of view of the scanner and weighed by a scale of the SST having weights that are outside a predefined range.

13. The method of claim 9, wherein providing further includes sending the details as item codes representing the bar codes to the software agent of the SST for automatic integration into the transaction.

14. A Self-Service (SS) management terminal, comprising:
a processor;
a non-transitory computer-readable storage medium having executable instructions representing an item exception manager; and
the item exception manager when executed by processor from the non-transitory computer-readable storage medium cause the processor to:
receive images from a scanner of a Self-Service Terminal (SST) for items being processed during a transaction at the SST through network interactions between the item exception manager and a software agent executing on the SST when the SST is unable to identify the items during the transaction within a preconfigured period of elapsed time;
obtain item codes for select images representing exception items for which the SST was unable to determine the item codes by extracting features from the select images and automatically initiating searches using the features against an item database, and receiving details and bar codes representing the item codes for the exception items as search results of the searches;
auto key the item codes into the transaction for the software agent of the SST and continuing the transaction; and
manage exception scenarios during the transaction from the SS management terminal including automatically resolving first exception scenarios and resolving second exception scenarios through an attendant interface provided on the management terminal, wherein the exception scenarios are managed by:
detecting the first exception scenarios and the second exception scenarios as any of: a failure to scan a particular bar code of a particular item during the transaction, a weight for the particular item is outside an expected range weight, the particular item requires age verification, and the transaction requires customer identification; and
processing the transaction without any intervention of an attendant being required to be present at the SST by automatically processing any of the first exception scenarios and the second exception scenarios through the item exception manager and the attendant interface by i) locating particular item details and a particular bar code for a particular image captured of the particular item and providing the particular item details and the particular bar code to the software agent for a particular transaction being processed at the SST, ii) receiving an override item weight from the attendant interface when a particular weight for the particular item is outside the expected range weight and providing the override item weight to the software agent for the particular transaction being processed at the SST, and iii) receiving an override item/customer verification from the attendant interface when the particular item requires the age verification or when the particular transaction requires the customer identification and providing the override item/customer verification to the software agent for the particular transaction being processed on the SST.

15. The SS management terminal of claim 14, wherein the item exception manager when executed by the processor from the non-transitory computer-readable storage medium is further configured to cause the processor to: present the select images on a display of the SS management terminal for visual review by an attendant operating the SS management terminal.

16. The SS management terminal of claim 14, wherein the SST is one of:
  Self-Service Checkout (SSCO) terminal, a kiosk, and an Automated Teller Machines (ATM).

\* \* \* \* \*